United Stat
Smith

[15] 3,644,238
[45] *Feb. 22, 1972

[54] CELLULAR MATERIAL INHIBITED FROM FOULING WITH MICRO-ORGANISM GROWTH

[72] Inventor: Richard L. Smith, Atlanta, Ga.
[73] Assignee: Lockheed Aircraft Corporation, Burbank, Calif.
[*] Notice: The portion of the term of this patent subsequent to May 27, 1986, has been disclaimed.
[22] Filed: May 22, 1969
[21] Appl. No.: 827,019

[52] U.S. Cl...............260/2.5 AK, 106/15, 260/2.5 BB, 260/2.5 N, 260/2.5 P, 424/25, 424/329
[51] Int. Cl............................................C08g 22/04
[58] Field of Search............260/2.5, 2.5 AL, 2.5 AK, 2.5 N, 260/2.5 P; 106/15; 424/25, 329

[56] References Cited

UNITED STATES PATENTS

| | | | |
|---|---|---|---|
| 3,169,071 | 2/1965 | Hochman | 106/15 |
| 3,278,486 | 10/1966 | Meek et al. | 260/47 |
| 3,471,423 | 10/1969 | Elmer et al. | 260/22 |
| 3,446,650 | 5/1969 | Smith | 117/62 |

FOREIGN PATENTS OR APPLICATIONS

| | | | |
|---|---|---|---|
| 217,914 | 10/1958 | Australia | 260/2.5 |
| 224,728 | 1/1958 | Australia | 260/2.5 |
| 229,612 | 4/1958 | Australia | 260/2.5 |

*Primary Examiner*—Donald E. Czaja
*Assistant Examiner*—Eugene C. Rzucidlo
*Attorney*—Roger T. Frost and George C. Sullivan

[57] ABSTRACT

A method and apparatus for inhibiting or preventing fouling of open-cell reticulate foams which are made of a material such as polyurethane or the like and which are used as inserts in aircraft fuel tanks. The micro-organisms present in turbine aircraft fuel such as kerosene can produce a gellike contaminant which rapidly forms in the cellular structure of open-cell foams and can completely fill or clog such structure, thus diminishing the fuel-carrying capacity of the tank and adding unwanted weight to the aircraft. The formation and adhesion of micro-organism growth in open-cell foams is eliminated or materially reduced by providing a foam incorporating a systemic toxin such as an acid addition salt of rosaniline. Dyes generally known as "Brilliant green" or "Malachite green" are suitable for use as such systemic toxins.

4 Claims, No Drawings

CELLULAR MATERIAL INHIBITED FROM FOULING WITH MICRO-ORGANISM GROWTH

This invention relates in general to foam structures and in particular to an improved open cell reticulated foam which inhibits or prevents fouling of the foam with micro-organisms of the kind found, for example, in aircraft fuel tanks.

From the inception of powered flight, aircraft used in combat have been subjected to the hazard of fuel tank puncture resulting from bullets or other hostile projectiles. In addition to the rapid and untimely loss of fuel caused by a punctured fuel tank, a bullet entering the tank causes a very real danger of fire and/or explosion within the tank. Aircraft fuel tanks are particularly vulnerable to this risk of combat since such tanks typically are positioned in the wings of the aircraft and thus are exposed to enemy fire. Because of this, even a chance shot from small arms fire on the ground can cause the destruction of an airplane and its crew.

Prior art proposals for alleviating the problem of aircraft fuel tank vulnerability have included armoring the tanks or equipping the tanks with a self-sealing substance. The extra weight of the armor needed to render the fuel tanks of an aircraft bulletproof, however, would render the aircraft virtually unusable for its intended mission. Self-sealing tanks, while generally preventing the fuel from escaping the tank and causing a fire outside the fuel tank, still do not reduce the danger of an internal fire or explosion caused in the fuel tank by the presence of a hot bullet.

A recent proposal for rendering aircraft fuel tanks more resistant to fire or explosion requires that the volume of the tanks be partially or completely filled with an open cell reticulated foam material. Such open-cell foams may be made of a material such as polyurethane or the like which is inert to the fuel used by the aircraft. In a typical sample of open-cell reticulated foam the open cells are about 4 millimeters in diameter and the reticulations which define the open cells have an average exemplary diameter of about 0.05 millimeters. Fuel placed in a tank containing open-cell reticulated foam is received in the open cells of the foam, which is sufficiently porous and lightweight that the range and load-carrying capacity of the aircraft having the foam in its fuel tanks is diminished by a relatively small amount. It is believed that the fire- and explosion-retardant properties of a fuel tank filled with open-cell reticulated foam arise from the ability of the foam to absorb enough heat energy from a bullet or the like to prevent the fuel contained in the cells from igniting. Additional details of such foam are contained in Military Specification Mil-B-83054 and in the *Applied Microbiology* article cited below.

Using open-cell reticulated foam to reduce the hazard of fire in an aircraft fuel tank gives rise to the problem of contamination and clogging of the open cells by micro-organisms contained within the fuel. Such micro-organisms may consist of a variety of bacteria, algae, fungi, yeast growths, and amoeba, many or all of which typically are present in the water which inevitably is present in fuel storage and transportation facilities and which is introduced into aircraft fuel tanks along with the fuel. Such micro-organisms are not only capable of living in the presence of turbine aircraft fuel, but actually use such fuel to grow and reproduce. The reproduction of such micro-organisms is particularly active in tropical or warm climates, and reproduction of the micro-organisms by cell division can occur in as little as 20 minutes under ideal conditions. Further details of the nature and characteristics of such micro-organisms are found in copending application Ser. No. 488,739, now U.S. Pat. No. 3,446,650 filed Sept. 20, 1965, and having inventorship and ownership in common with the present invention.

When turbine fuel containing such micro-organisms is placed in a tank containing open-cell reticulated foam, the cells of the foam rapidly become fouled or clogged with a gel-like substance made up of micro-organisms, fuel, and water. This gel can have the physical appearance and consistency of thick vanilla pudding and can completely clog the open cells of the foam, thus greatly increasing the aircraft weight and seriously reducing the effective fuel capacity of the tank. As a practical matter, accordingly, open-cell reticulated foams cannot be used in aircraft fuel tanks and especially the fuel tanks of turbine aircraft unless some technique is provided to inhibit or prevent the formation and growth of micro-organism substances in the foam. Although prior art attempts to suppress micro-organism growth in open cell foam have occurred, as shown in *Applied Microbiology*, Vol. 16, No. 2, Feb. 1968 (pp. 426 and 427), such attempts have been substantially unsuccessful. The term "turbine aircraft" as used herein is intended to denote aircraft whose engines utilize kerosene or a kerosene type of fuel, since kerosene type fuel is quite palatable to the micro-organisms discussed herein.

Accordingly, it is an object of the present invention to provide an improved open-cell reticulated foam.

Another object of the present invention is to provide an improved open-cell reticulated foam for use in aircraft fuel tanks.

Still another object of the present invention is to provide an open cell reticulated foam which inhibits or prevents micro-organism growth.

Still another object of the present invention is to provide an open cell reticulated foam which inhibits or prevents fouling of the cellular structure of the foam with micro-organism growth.

Other objects and many of the attendant advantages of the present invention will become apparent from the description which follows herein.

Stated generally, open-cell reticulated foam according to the present invention incorporates a substance which is a systemic toxin to the micro-organisms present in turbine fuel and which is insoluble in the fuel. The systemic toxin is an acid addition salt of rosaniline. This compound is represented by the following structural formula:

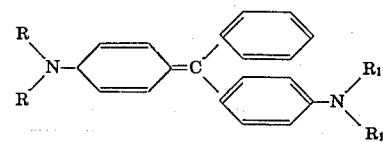

wherein R and R₁ methyl, and ethyl hydrogen, butyl, in which at least one such group has a cation capable of rendering the compound soluble in water and compatible with the polymeric material with which it is employed.

Open-cell reticulated foam of the type which may be used in aircraft fuel tanks frequently is made from polyurethane, although other polymeric materials such as polyesters, polyvinyl chlorides, vinyl acetate-vinyl chloride copolymers and the like suggest themselves to those skilled in the art as materials useful for the production of open cell reticulated foam. In the case of polyurethane foam, for example, the exact mechanism whereby micro-organisms found in turbine fuel form a gel which lodges in the open cells is not known with certainty. According to one theory, the micro-organisms present in the fuel become attached to the polyurethane reticulations through some mechanism, possibly penetration, and then multiply to form a gel partially or completely filling all of the open cells of the foam.

The fouling of open-cell reticulated foam made of polymer materials is prevented or inhibited by incorporating in the polymer material a rosaniline salt having a structure including three benzene rings and two amine groups. Dyes known as "Brilliant green" or "Malachite green" are examples of such structures which find application as systemic toxins to turbine fuel micro-organisms.

The structural formulas for Brilliant green and for Malachite green are found in *The Merck Index*, Sixth Edition, at pages 159 and 595, respectively, and are:

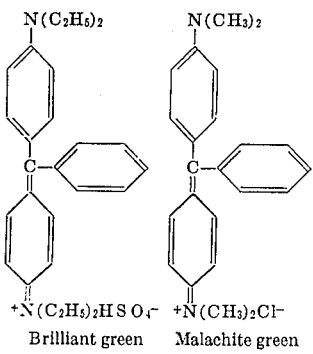

Brilliant green Malachite green

The systemic toxins can be applied to the open cell foam by several methods. For example, the systemic toxins may be dissolved in a suitable solvent substance which is compatible with the open-cell foam material and the resulting solution used to coat or impregnate the foam with the systemic toxin solution. The use of methyl alcohol as a solvent for the systemic toxin is advantageous since methyl alcohol is not harmful to polymer foam materials and since any residual amount of the methyl alcohol-systemic toxin solution not removed from the foam by flushing can be accommodated by turbine power plants.

As an example of an improved open-cell reticulated foam according to the present invention, a quantity of such foam of a type intended for use in military aircraft and made of polyurethane was soaked for one hour in a methyl alcohol solution containing a 5 percent concentration of Brilliant green. Following removal of the foam from the solution, the foam was drained and the excess solution was rinsed off with water. The treated foam and an untreated control quantity of otherwise identical foam were immersed for 10 days in a mixture of turbine fuel, water, and fuel micro-organisms. The mixture was periodically agitated during immersion to simulate the motion of flight. At the end of the 10-day period, the open cells of the untreated foam were completely clogged with a thick gel of fuel, water, and micro-organisms, and the gel had expanded beyond the nominal exterior dimensions of the foam sample. In contrast, the foam treated as described above was completely free of any gel or other micro-organism contaminants. Cutting of the reticulations in the foam treated by immersion in a solution of systemic toxin, as described above, showed that the Brilliant green dye had completely penetrated the polyurethane material of the reticulations. In terms of quantity, approximately 0.1 percent to 0.5 percent, by weight, of systemic toxin usually is employed in the polymer material. However, effective prevention or inhibition of gel formation occurs with as little as 0.01 percent, by weight, of the systemic toxin, and as much systemic toxin as desired may be utilized so long as the structural and chemical properties of the foam material are not adversely affected. The period of application of the solution to the foam is secondary to the attainment of the desired quantity of systemic toxin.

As an alternative to the immersion coating of existing open cell foam, as described above, the systemic toxin can be incorporated in the polymer material before the foam is made from such material. For example, Brilliant green containing as its major constituent tetraethyl-p-triphenyl diamine sulfate was incorporated with 2-ethoxyethane acetate to saturation. Only approximately five percent, by weight, of the Brilliant green dissolved in the ethoxyethane acetate. This solution then was admixed with the conventional resin component of the two-part polyurethane-solvent system from which open cell polyurethane foam is produced. Additional Brilliant green-ethoxyethane acetate can be admixed with the resin component to yield a final mixture containing the desired weight of Brilliant green. The resultant mixed polyurethane material is then foamed by conventional techniques to produce an open-cell reticulated foam having the systemic toxin incorporated therein. Techniques for the production of flexible polyurethane foams are well known to those skilled in the art and are disclosed, for example, in "Manufacture of Plastics," by W. Mayo Smith, Reinhold Publishing Corp. 1964, and in "-Polyurethanes," by Bernard A. Dombrow, Reinhold Publishing Corp. 1957. As an example of a known technique for obtaining the open-cell foam structure, the partially cured flexible foam is subjected to a solvent, such as toluene, which removes the relatively thin cell walls before the relatively thick cell reticulations can be dissolved. The foam then is rinsed to remove the solvent and the curing is completed.

While the open-cell reticulated foams treated according to the present invention have been described in an aircraft fuel tank environment of use, it will be apparent that the treated foams are not limited to such use and can be used wherever such foams are subjected to undesired micro-organism growth.

What is claimed is:

1. An article for retention in the fuel-receiving volume of a fuel tank, comprising in combination:
   an open-cell reticulate organic polymeric foam having a cellular structure which permits the substantially unimpeded flow of fuel into and out of the volume comprised by the open cells; and
   an acid addition salt of rosaniline incorporated for the prevention and inhibition of micro-organism growth in said polymeric foam in an amount to inhibit the attachment and growth of micro-organisms within said cellular structure of the foam, said acid addition salt of rosaniline being selected from the group consisting of Brilliant green and Malachite green.

2. An article as in claim 1, wherein said open cell reticulate foam is made from polyurethane.

3. An article as in claim 1, wherein said reticulate foam contains up to 0.5 percent by weight of said acid addition salt.

4. An article as in claim 1, wherein said reticulate foam contains at least 0.01 percent by weight of said acid addition salt.

* * * * *